J. E. STRIETELMEIER.
WHEEL.
APPLICATION FILED FEB. 23, 1911.
1,008,679.
Patented Nov. 14, 1911.
2 SHEETS—SHEET 1.
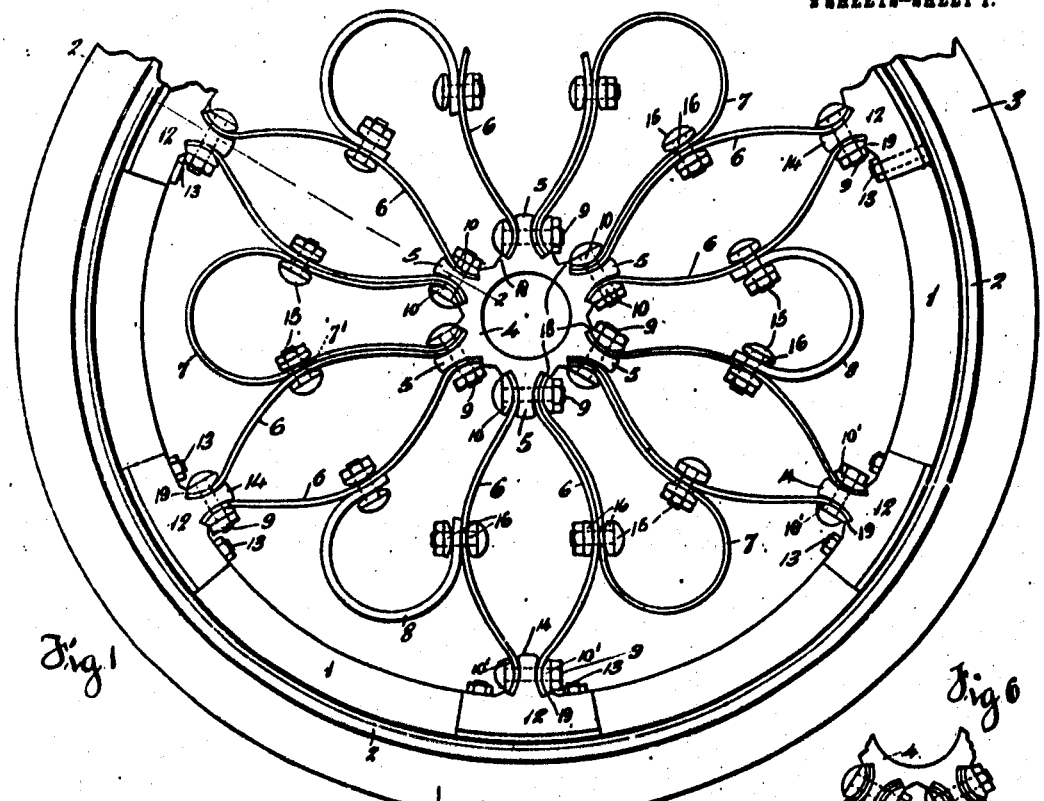
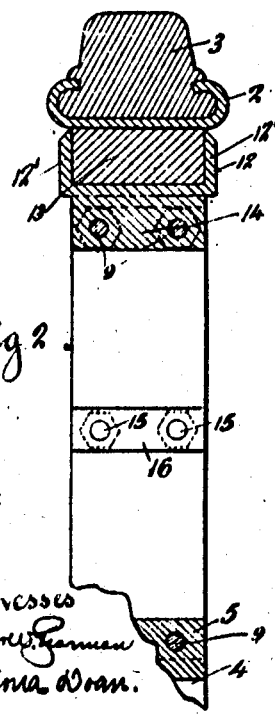
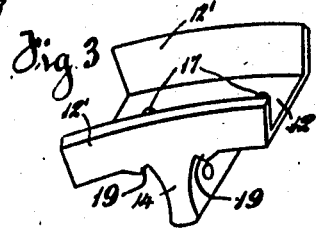
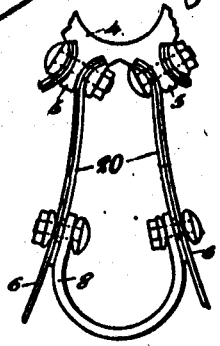
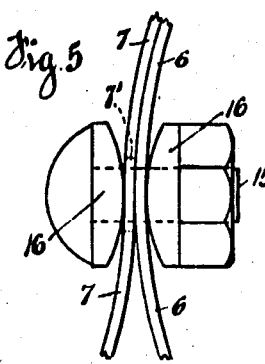
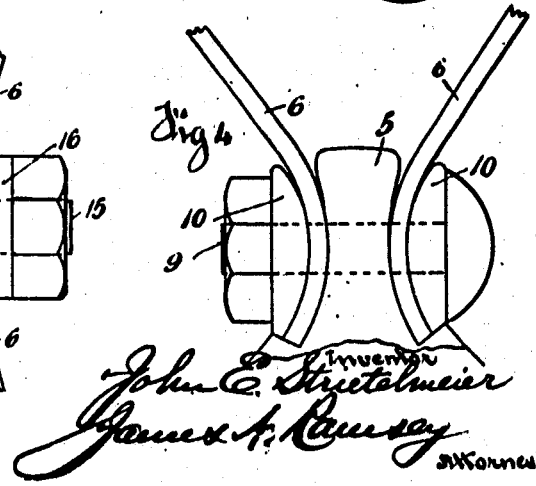

J. E. STRIETELMEIER.
WHEEL.
APPLICATION FILED FEB. 23, 1911.
1,008,679.
Patented Nov. 14, 1911.
2 SHEETS—SHEET 2.
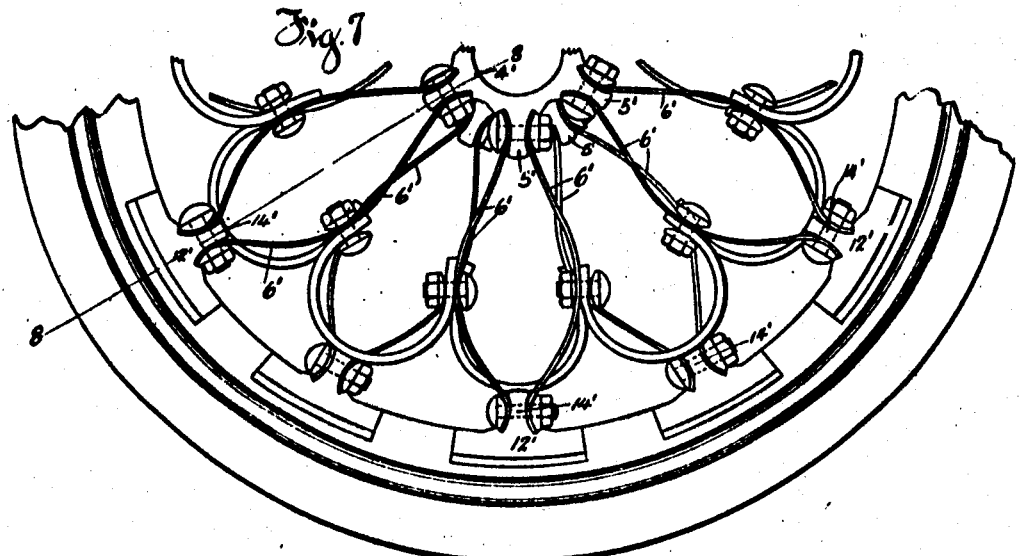
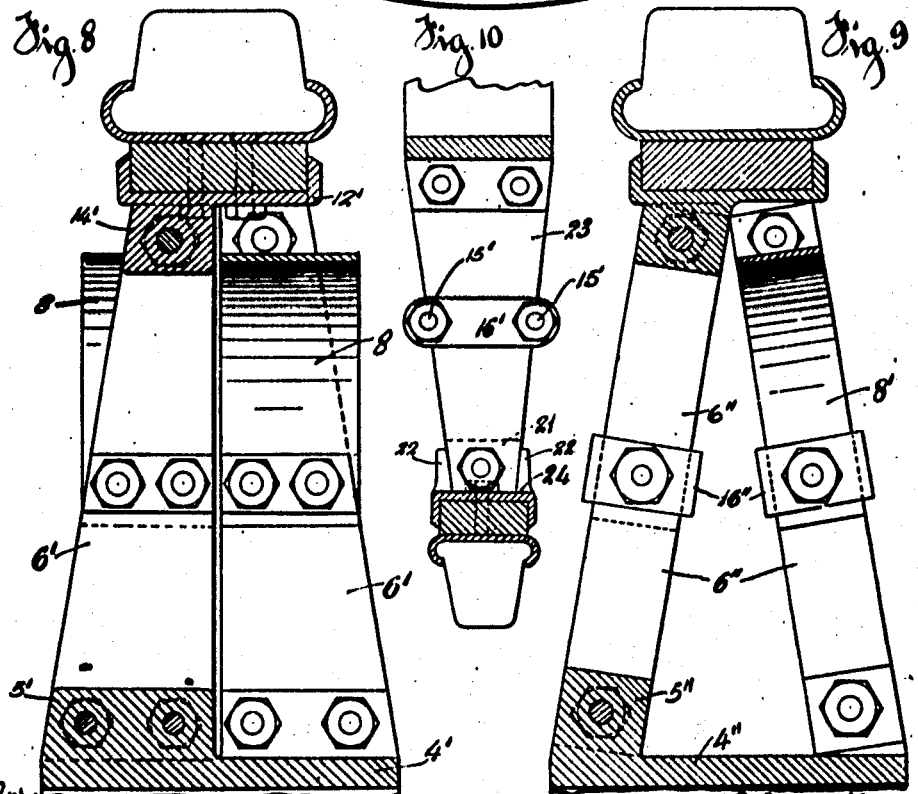

UNITED STATES PATENT OFFICE.

JOHN E. STRIETELMEIER, OF CINCINNATI, OHIO, ASSIGNOR TO THE IDEAL WHEEL COMPANY, OF CINCINNATI, OHIO, A CORPORATION OF OHIO.

WHEEL.

1,008,679. Specification of Letters Patent. Patented Nov. 14, 1911.

Application filed February 23, 1911. Serial No. 610,243.

*To all whom it may concern:*

Be it known that I, JOHN E. STRIETELMEIER, a citizen of the United States, residing at Cincinnati, in the county of Hamilton and State of Ohio, have invented certain new and useful Improvements in Wheels, of which the following is a specification.

My invention relates to wheels, and more particularly to efficient means for reducing the force of jars and jolts on the rim thereof.

The object of my invention is to construct a wheel having springs between the hub and outer rim thereof, and to construct the springs in such manner that they will all unite in equalizing the weight or any strain or jar, when the pressure is on one point of the wheel, distributing same throughout the wheel, thereby minimizing the effect of same upon the vehicle.

Another object of my invention is to construct the springs in a peculiar form and combine them in such a manner as to produce a strong, durable and efficient resilient wheel.

Another object of my invention is to produce means for connecting the springs to the hub and to the rim of the wheel, and also to each other, by means of connections, which while freely admitting of the movement required, will be firmly secured, and upon which there is little wear.

Another object of my invention is to produce a wheel of sufficient resiliency between the hub and rim having a cushioned tread that the jars and shocks against said cushioned tread will be more evenly distributed throughout the wheel than heretofore, and thereby lessening the damage or wear to the cushioned tread, as well as to minimize the jars to the vehicle.

Another object of my invention is to provide resilient reinforcement adjacent the hub portion thereof, owing to the fact that a great deal of strain is placed upon this part of the wheel when the brakes are applied, and when the clutch of an automobile is thrown into engagement.

My invention consists in constructing the hub of a wheel with suitable lugs of a peculiar shape so as to allow the springs of the wheel to be fastened tightly thereto, and also in providing a series of fastening devices around the rim of the wheel, and provided with suitable lugs thereon to which the springs are fastened at their other ends.

My invention consists more specifically in a rim, a hub, bowed springs forming spokes extending radially from said hub, and intermediate springs connecting said bowed spring spokes to equalize and distribute the pressure placed upon the wheel, and also to strengthen the spring spokes of the wheel adjacent the hub thereof.

My invention also consists in fastening the spring spokes tightly to the hub and rim of the wheel, and so as to admit of little wear, and still obtain ample resiliency of the springs to produce a cushioned effect upon the vehicle.

My invention also consists in the parts and in the combination and arrangement of parts as herein set forth and claimed.

In the accompanying drawings which serve to illustrate my invention: Figure 1 is a side elevation of a wheel equipped with my invention, part being broken away. Fig. 2 is a cross section taken on the line 2—2 of Fig. 1. Fig. 3 is a perspective view of one of the devices used for fastening the springs to the rim of the wheel. Fig. 4 is an enlarged detail view of the fastening means, whereby the spring is fastened to the hub of the wheel. Fig. 5 is a detail view, illustrating how the spring spokes and intermediate springs are fastened together. Fig. 6 illustrates a modification. Fig. 7 is a fragmentary elevation view of a wheel illustrating a duplex form of my invention. Fig. 8 is a sectional view taken on the line 8—8 of Fig. 7 and illustrates how the springs are arranged in pairs and made wider adjacent the hub of the wheel. Fig. 9 shows another modification of my invention, the springs being made of uniform width and the supports at the hub being spaced apart. Fig. 10 is another modification of my invention, illustrating how a single spring may be widened at the hub portion to increase its strength, and also illustrating how the washers or plates mounted at the center thereof may be fastened by means of the bolts passing through the notched edges of the spring.

In the embodiment of my invention as illustrated, and which shows a preferred construction, 1 represents the rim of the wheel, being preferably made of wood, having a clencher flange metal rim 2 thereon, to receive a tire 3.

4 illustrates the hub of the wheel provided with lugs 5 thereon, to which leaf spring spokes 6 are fastened.

Interposed between the spring spokes 6 I provide leaf springs 7 and 8. The springs 7 are adapted to extend down to the hub of the wheel and fasten adjacent the spring spokes 6 for the purpose of strengthening the central part of the wheel. The bolt hole 7' in the central part of the spring 7 is elongated lengthwise of the spring to permit of longitudinal movement thereof relatively to the spring spokes 6 when yielding under pressure as clearly shown in Fig. 5. Each leaf spring 8 is bent to form a part circle, and is fastened to leaf spring spokes 6 between their ends. The washers 10 and 10' are each elongated and adapted to engage two bolts and nuts as shown. If desired, springs made after the style of spring 7 may be used for intermediate spokes instead of using the springs 8, or vice versa, the springs 8 may be used instead of the springs 7.

It is readily seen that by using springs as spokes in a wheel of this character, a great deal depends upon the fastening means of the springs, and it is one of the important features of this invention to produce means whereby the springs may be tightly held in position, without fear of them becoming worn and loosened so as to create rattling. To accomplish this result, I provide the lugs 5 on the hub, having concave surfaces on each side, the ends of the springs 6 being bent to fit the concave surface of the lugs 5. Suitable holes are provided in the lugs 5 to receive bolts 9. Washers 10 are provided and are constructed with a convex surface 11 on one side, adapted to fit the concave surfaces of the springs 6 when they conform to the surfaces of the lugs 5. Bolts 9 are then inserted through suitable holes in the washers 10 and through the openings in the lugs 5 and are then tightened.

It is readily seen by referring to Fig. 4 that the springs 6 have plenty of room between the washers 10 and the lugs 5 at the top thereof to spread or straighten without bending over a sharp edge, as would be the case if the top edges of the washers 10 and the lugs 5 fit closely to said springs 6. This would, of course, tend to break the springs 6 and would produce a weaker wheel. However, the springs are securely locked and held at their ends by the action of the convex sides of the washers 10 pressing the springs 6 against the concave sides of the lugs 5, thereby reducing the strain on the bolts and the spring at the bolt holes.

The springs 6 are fastened in exactly the same manner to fastening members 12, mounted on the rim of the wheel by means of bolts 13. The fastening members 12 are also provided with lugs 14 corresponding to the lugs 5 on the hub, the lugs 14 having concave sides for the purpose of producing a more secure holding for the springs 6. The washers 10' are then used with the bolts 9 in the same manner as on the hub, thereby producing a secure fastening for the springs. The fastening members 12 are also provided with flanges 12' adapted to engage the sides of the wooden rim 1 of the wheel, and are also provided with suitable openings 17 to allow the holding device to be fastened to the top rim by the bolts 13.

Shoulders 18 are formed upon the hub 4 upon each side of the lugs 5 against which the inner end of each spring spoke 6 is adapted to firmly rest. One edge of each washer 10 is also adapted to abut against said shoulders whereby the end of the springs are more securely held. Similar shoulders 19 are formed on the fastening members 12 for the purpose of engaging the outer ends of the spring spokes 6 and one edge of each washer 10'.

The springs 6 forming the spokes of the wheel, are fastened to the intermediate springs 7 and 8 by means of bolts 15, which are best shown in Fig. 5. The bolts 15 are provided with suitable washers or elongated plates 16 which have a convex surface on one side thereof, which are adapted to engage the sides of the springs which they are adapted to hold together. By means of the convex surfaces on the washers, the springs are allowed to expand and contract without fear of them being broken by coming in contact with the sharp edges of the washers.

Various modifications of my invention may be made without departing from its spirit or scope, as for instance, the central portion of the wheel may be reinforced by resilient members or springs 7, or by means of the auxiliary spring members 20, and I do not therefore wish to be limited to the precise details of construction and arrangement set forth.

It is a well known fact that the wheel, especially of an automobile, which is connected to the driving mechanism of the machine is under greater strain at the hub portion thereof than any of the other wheels of the machine. Therefore it is necessary to construct said wheel stronger adjacent the hub. To accomplish this result, I construct the springs forming the spokes 6' of greater width at the hub than at the rim, the preferred form of which is shown in Fig. 8. The springs 8 are then bolted in the usual manner.

It is seen in Fig. 8 that the wheel can readily be constructed in a duplex form, that is having complete sets of springs side by side with only one hub and one rim. Each spring 6' may be made wider at the hub and narrower at the rim, the rim portion being secured by means of one bolt, whereas the hub portion may be secured in the usual manner with two bolts. In constructing a wheel after this fashion, it is necessary to construct the fastening members 12' with lugs 14', the lugs 14' being placed at the side of the fastening members 12', as shown in Fig. 8. The lugs 14' shown in section in Fig. 8 for the springs 6' are placed on the left hand side of the fastening member 12'. The lugs 14' on the following fastening member 12' will be placed on the right hand side to allow for the connection of the springs 6' on the right hand side of the wheel. Thus the lugs 14' on the fastening members 12' are staggered to register with the springs 6' which are also staggered accordingly. The hub 4' is also provided with lugs 5' which are also staggered in the same manner as the lugs 14' on the members 12'. Thus one complete set of springs on one side of the wheel is placed on said wheel in such manner as to allow the springs 6' on one set to be disposed between the springs 6' of the other set, thus producing a more evenly balanced wheel, as shown in Fig. 7.

A cheaper form of accomplishing the same result or where there is no driving strain required of the wheel, is shown in Fig. 9 where it is seen that the springs 6'' are made of uniform width, preferably coming together at the rim and separated at the hub portion of the wheel, thereby imparting the necessary strength to the hub portion of the wheel, and making the wheel strong against side strain. In this form of wheel the springs 8' may be made the same width as the springs 6'' and the hub 4'' may be provided with lugs 5'' for the purpose of forming a connecting means for the springs 6''. These springs are arranged radially in the same manner as the springs 6' of Fig. 8 each set being staggered relatively to the other around the wheel. In this form the plate washers 16'' are provided with a flange on each side to engage the edges of springs 8' holding it fixed relatively to said spring.

Fig. 10 illustrates a simpler form of construction employing the single spring 23 made wider at the hub portion thereof, and being fastened thereto by means of two bolts, tapering therefrom to the rim to which it is fastened with one bolt. In order that the spring 23 may not be weakened at its central portion where the intermediate springs are fastened, notches are provided in the sides of said spring 23 which are adapted to receive the bolts 15', the washers 16' being made longer than usual and forming clamp plates. The fastening members 24 in this form of wheel are provided with the extending lugs 21 which are provided with shoulder extensions 22 at the side thereof to form a recess in the lugs 21 into which the ends of the springs 19 are adapted to fit. This arrangement will relieve some of the strain on the single bolts fastening the springs 19 to the rim of the wheel.

The construction and arrangement of the parts as illustrated in Figs. 1 to 5 inclusive are adapted and intended for all ordinary usages, while the construction shown in Fig. 7 to 10 inclusive is especially adapted and intended for wheels requiring greater strength, such as automobile freight trucks and the like, in which case the construction illustrated in Fig. 8 is especially adapted for the rear or driving wheel, and the construction shown in Fig. 9 for the other wheels.

I claim:

1. A wheel comprising a rim, a hub, a series of bowed spring spokes extending radially from said hub to said rim and bulging from each other at their central part and bulging in the reverse direction near each end, outwardly extending lugs on said hub and inwardly extending lugs on said rim each having curved surfaces adapted to receive the curved end surfaces of the spring spokes respectively, and bolts extending transversely through said lugs and spring spokes respectively, nuts adapted to secure and clamp said spring spokes in position, and a series of intermediate curved springs secured at their ends to said bowed spring spokes between their ends, and another series of curved spring spokes secured to the spring spokes at the end adjacent the hub and also near the center of the convex sides of said spring spokes, substantially as set forth and for the purposes specified.

2. A wheel comprising a rim having a series of inwardly extending lugs thereon, a hub having a series of outwardly extending lugs thereon, bowed spring spokes arranged in pairs and bulging from each other in their central part, and tapering toward each other near their ends and suitably secured at each end to said lugs respectively, and intermediate springs secured to and between said pairs of spring spokes intermediate of their ends, and bulging outwardly toward the rim, substantially as set forth and for the purposes specified.

3. A wheel comprising a rim, a series of fastening means secured thereto and each having a lug extending inwardly, said lugs having concave surfaces upon their opposite sides, a shoulder on said member at one end of each concave surface, a hub provided with a series of outwardly extending lugs having concave surfaces on their opposite sides, a shoulder at one end of each concave surface and spring spokes curved to normally fit said concave surfaces and each adapted to have its ends bear firmly against said shoulders, and means for fastening said spokes to said lugs, and of yieldingly connecting said spring spokes to each other in pairs between their ends, substantially as set forth and for the purposes specified.

4. A wheel comprising a rim, a hub, spring spokes secured to said hub and said rim respectively, curved springs secured by bolts and nuts between said spokes at their ends adjacent the hub and between their ends, said springs having elongated bolt openings lengthwise of the spring between the ends of said curved spring, whereby longitudinal movement of said curved spring relative to said spring spokes is permitted during the yielding of said springs and spring spokes.

JOHN E. STRIETELMEIER.

Witnesses:
 JAMES N. RAMSEY,
 WINONA DOAN.